Dec. 21, 1954     B. S. HARRINGTON     2,697,446
FILLING NOZZLE ASSEMBLY
Filed April 7, 1951
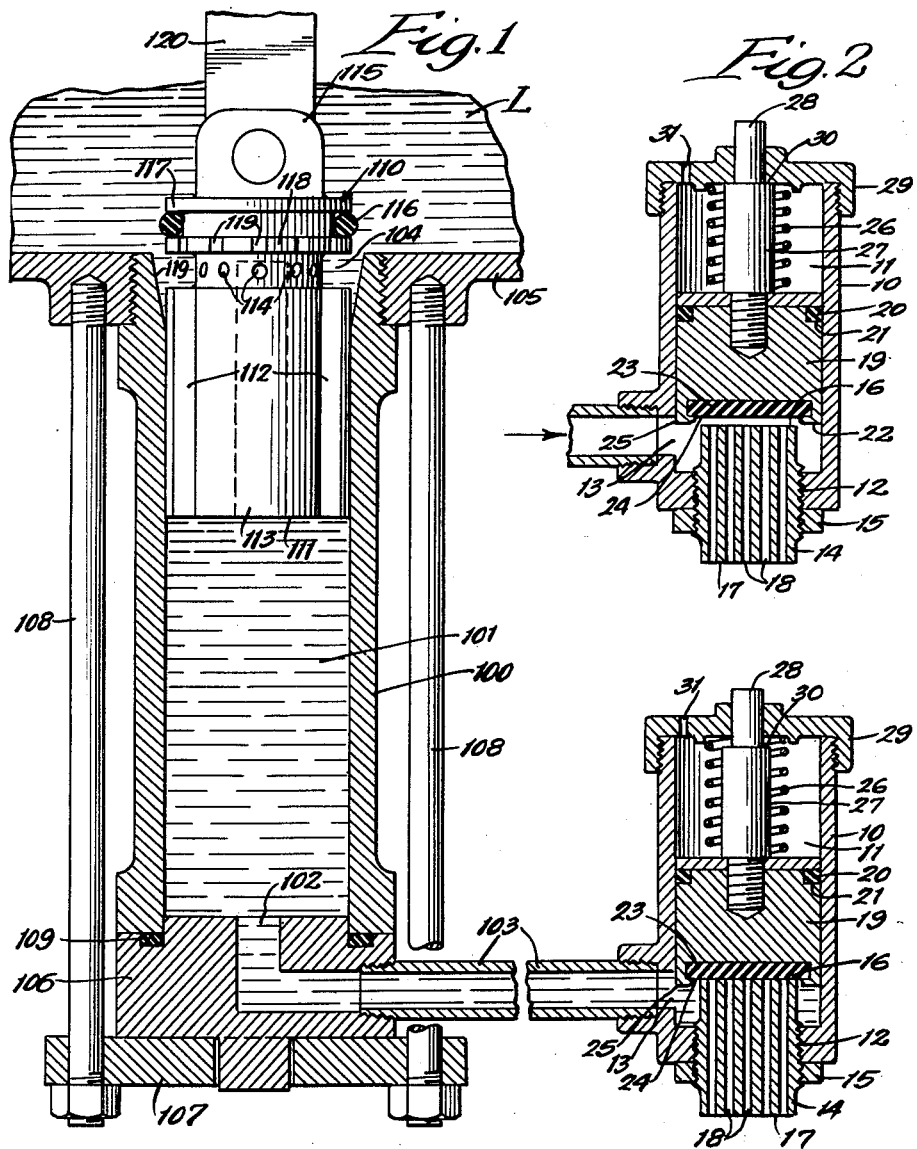
INVENTOR:
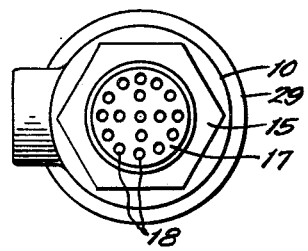
Bertie S. Harrington,
BY
Dawson & Ooms,
ATTORNEYS.

United States Patent Office 2,697,446
Patented Dec. 21, 1954

2,697,446

FILLING NOZZLE ASSEMBLY

Bertie S. Harrington, Chicago, Ill., assignor to Armour and Company, Chicago, Ill., a corporation of Illinois Application April 7, 1951, Serial No. 219,786

5 Claims. (Cl. 137—509)

My invention relates to a filling nozzle assembly, and more particularly a filling nozzle assembly for dispensing liquids of relatively low viscosity.

It is an object of my invention to provide a filling nozzle assembly for dispensing accurately measured quantities of liquids of relatively low viscosity. More specifically, it is an object of my invention to provide a filling nozzle assembly for use in connection with a measuring cylinder of a filling machine or the like which is effective in achieving a precise cutoff or termination of the flow of the liquid being dispensed, and which thereafter prevents the filling nozzle from dripping or otherwise increasing the measured quantity of fluid dispensed. Still more specifically, it is an object of my invention to provide a filling nozzle assembly containing means for terminating the outflow of fluid through the filling nozzle which is substantially instantaneously responsive to the drop in pressure in the fluid being dispensed produced by the piston within the measuring cylinder reaching its inmost point at the end of its stroke. It is also an object of my invention to provide cutoff means in a filling nozzle assembly which eliminates the need for an outlet check valve or similar valve structure in the measuring cylinder. It is a still further object of my invention to provide a filling nozzle assembly which is operative to precisely terminate the outflow of fluid and to prevent dripping from the filling nozzle regardless of whether the dispensing nozzle is positioned above or below the outlet from the measuring cylinder, and which remains fully responsive to the control of the measuring cylinder even though positioned a considerable distance away from the measuring cylinder. It is another object of my invention to provide a filling nozzle assembly which instantaneously and effectively seals the outlet nozzle and the outlet passage so that a substantially complete vacuum can be drawn within the measuring cylinder without admitting additional liquid until the measuring piston reaches the top of its stroke, whereupon the measuring cylinder fills instantaneously. Further objects and advantages will appear as the specification proceeds.

My invention is shown in an illustrative embodiment in the accompanying drawing in which—

Figure 1 is a side elevational view partially in section showing my filling nozzle assembly connected to the preferred form of measuring cylinder with the assembly in closed position; Fig. 2, a side elevational view partially in section showing the filling nozzle assembly of Fig. 1 in open position; and Fig. 3, a bottom view of the filling nozzle assembly shown in Figs. 1 and 2.

In the embodiment shown, my filling nozzle assembly consists of a casing or cylinder 10 providing a circular chamber 11 therein. Chamber 11 has an outlet opening at the bottom thereof through aperture 12 in the lower end of casing 10. Chamber 11 is also provided with an inlet opening 13 through the side wall of the lower end portion of casing 10. Preferably, inlet opening 13 is located closely adjacent outlet opening 12, as shown.

Within outlet opening 12 there is mounted a nozzle plug 14. In the illustration given, this is accomplished by interiorly threading aperture 12 and exteriorly threading nozzle plug 14, so that nozzle plug 14 can be screwed into opening 12 to establish a tight seal with casing 10 around the circumference thereof. When this means of mounting nozzle plug 14 is utilized, if desired a lock nut 15 can be used to clamp nozzle plug 14 in place. In the illustration given and preferably, nozzle plug 14 extends a short distance within chamber 11 and terminates in a flat smooth end 16 perpendicular to the vertical axis of cylinder 10. It is also desirable that the external end of valve plug 14 provide a relatively smooth face 17 parallel to inner face 16.

Nozzle plug 14 is provided with a plurality of openings 18 therethrough communicating from inner face 16 to outer face 17. Openings 18 are preferably straight and of very small diameter. I have found that in general holes 18 may range in diameter from about .05 to 3 millimeters. The length of openings 18 between inner face 16 and outer face 17 is not especially critical. In general I have found it best to have openings 18 from one-half inch to two inches in length.

Above nozzle plug 15 within chamber 11 there is slidably mounted a circular piston plug 19. Piston plug 19 can be equipped with any suitable sealing means therearound to produce a dynamic seal between piston plug 19 and the walls of chamber 11 to prevent liquid entering through inlet 13 from passing upwardly around piston plug 19 into the upper portion of chamber 11. In the illustration given, a flexible resilient sealing ring 20 is secured around the rear of piston plug 19 within an annular groove 21.

The lower or inner end 22 of piston plug 19 is adapted by any suitable means to seat on inner face 16 of nozzle plug 14 and thereby seal openings 18 at their upper inner ends. Preferably, a flexible resilient disk 23 is mounted on end 22 of piston plug 19. In the illustration given, disk 23 is secured within an annular recess 24 in end 22. This structure has the advantage of protecting the sealing engagement by an annular lip or shoulder 25 extending below inner face 16 of nozzle plug 14 when piston plug 19 is seated thereon.

Any suitable means can be provided for normally urging piston plug 19 into sealing engagement with the inner end of nozzle plug 14. In the illustration given, a compression spring 26 is utilized for this purpose. It is apparent that the strength of compression spring 26 will determine the amount of hydraulic pressure required to open nozzle plug 14 by disengaging piston plug 19 from the inner end thereof. Preferably, spring 26 is constructed so as to exert a relatively strong force against piston plug 19 so as to close nozzle 14 substantially simultaneously with the diminution of the fluid pressure within chamber 11.

Although it is not essential, I have found it desirable to provide means for limiting the outward movement of piston plug 19 when disengaged by the hydraulic pressure within chamber 11. By preventing piston plug 19 from being moved upwardly more than a very short distance, say one-eighth to one-fourth inch, while utilizing a relatively strong spring to urge plug 19 downwardly, on the drop of fluid pressure within chamber 11 piston plug 19 moves downwardly with an essentially trigger action so as to close openings 18 simultaneously with the termination of inflow through inlet 13. In the illustration given, this is accomplished by threading a guide pin 27 into the upper end of piston plug 19. Guide pin 27 has a reduced end portion 28 sliding within an aperture of cap 29. Between reduced end 28 and the body of guide pin 27 there is provided an annular shoulder 30 of larger diameter than the aperture in cap 29 within which reduced end 28 slides. Thus, upon piston plug 19 moving upwardly a short distance shoulder 30 strikes the under surface of cap 29 and piston plug 19 is prevented from further upward movement. Compression spring 26 can be conveniently coiled about guide pin 27.

In the illustration given, cap 29 is threadedly connected to the exterior of casing 10 and is provided with a vent opening 31 for the inflow and outflow of air during the movement of piston plug 19.

The filling nozzle assembly which has just been described can be used in connection with any suitable type of measuring cylinder delivering measured quantities of fluid under pressure at periodic intervals. However, I prefer to utilize my filling nozzle assembly in connection with a measuring cylinder structure of the type shown in Fig. 1. The structure of this type of measuring cylinder is more completely described in my co-pending application, U. S. Serial No. 219,785, filed April 7, 1951. My filling nozzle assembly has particular utility with a measuring cylinder of this type because it eliminates the necessity of an outlet check valve in the bottom of the measuring cylinder while effectively sealing the outlet passage during the drawing of a substantially complete vacuum within the measuring cylinder until the piston reaches the top whereupon the cylinder fills instantaneously.

As shown in Fig. 1, this type of measuring cylinder consists of a casing 100 providing therein a circular measuring chamber 101 having an outlet passage 102 through the lower end of casing 101. In the illustration given, outlet passage 102 is connected with inlet opening 13 by a pipe 103. Pipe 103 can be of considerable length, say up to ten feet, and may extend upwardly or downwardly from the lower end of casing 100 without effecting the operation of my filling nozzle assembly.

In the illustration given, the upper open end 104 of casing 100 is threadedly connected to plate 105 which may form the bottom of a tank containing the liquid "L" to be dispensed. To facilitate cleaning, an end closure 106 is clamped by member 107 and tie rods 108 to the lower end of casing 100, and sealed thereto by sealing ring 109.

Within chamber 101 there is slidably mounted a piston 110. Piston 110 has a forward circular plug 111 which remains at least partially within casing 100 at all times. Plug 111 is provided with passages therethrough for the inflow of liquid into chamber 101. In the illustration given, side channels 112 and interior opening 113 are provided. Interior opening 113 communicates with peripheral openings 114 above plug 111 around reduced end 115.

Reduced end 115 is provided with a sealing means consisting of a ring 116 of resilient flexible material such as rubber sandwiched between an upper annular flange 117 and a lower annular flange 118. Lower annular flange 118 has peripheral notches 119 to assure that ring 118 will seal chamber 101 on exactly the same line during each downward stroke of piston 110. Also, the open end 104 of casing 100 is beveled or flared outwardly at 119 to assist in producing the seal at the same point.

It will be understood that piston 110 can be reciprocated by any suitable means through actuating arm 120. In the operation of piston 110, it is moved downwardly from the position shown in Fig. 1 until ring 116 sealably engages the interior walls of casing 100. At this point, further downward movement of piston 110 produces an outflow of fluid under pressure through outlet passage 102. It will be understood, that the distance piston 110 travels downwardly after becoming sealably engaged to casing 100 will determine the volume of fluid flowing outwardly through passage 102 during each downward stroke. When piston 110 reaches the bottom of its stroke and begins to move upwardly a substantially complete vacuum is created within chamber 101 until sealing ring 116 enters beveled portion 119, whereupon the liquid "L" flows into chamber 101 by openings 114 and 113 and through side channels 112.

At the instant when piston 110 becomes sealably engaged with casing 100 so as to create hydraulic pressure therein, this hydraulic pressure is immediately transferred through the fluid in outlet passage 102, pipe 103 and chamber 11 to the inner end 22 of piston plug 19. Piston plug 19 is thereupon moved upwardly against the force of spring 26 so as to unseat disk 23 from the inner face 16 of nozzle plug 14. The liquid being dispensed thus immediately begins to flow outwardly through openings 18 in nozzle plug 14. This flow continues until piston 110 reaches the bottom of its stroke and causes the hydraulic pressure to drop within chamber 11. Thereupon, piston plug 19 snaps downwardly and seats sealing disk 23 on inner face 16 of nozzle plug 14. By limiting the upward movement of piston plug 19 and using a relatively strong spring 26, piston plug 19 seats immediately without lag and tightly seals openings 18 at their upper ends. This sharply terminates the outflow of fluid simultaneously with the stopping of downward movement of the dispensing piston, and further effectively seals the liquid within openings 18 so as to prevent dripping.

While in the foregoing specification I have set forth specific structures in considerable detail for illustrating an embodiment of my invention, it will be understood that many of the details specified can be widely varied by those skilled in the art without departing from the spirit of my invention.

I claim:

1. A dripless precision cutoff nozzle assembly adapted for dispensing a low viscosity liquid, comprising a casing providing a chamber therein and having an outlet opening through one end and an adjacent inlet opening, a nozzle plug maintained in said outlet opening, said plug having a plurality of openings therethrough of very small diameter communicating from the inner end of said plug to the exterior end thereof, a piston plug slidably mounted within said chamber and having an inner end bottoming on the inner end of said nozzle plug, said piston plug having sealing means therearound arranged to dynamically seal said piston plug to the inner walls of said casing and a resilient member on the inner end thereof adjacent the inner end of said nozzle plug arranged to seal said nozzle plug openings when said piston plug is bottomed on said nozzle plug, and yieldable means for normally urging said piston plug into sealing engagement with said nozzle plug, said inlet opening communicating with the inner end of said piston plug when said piston plug is bottomed on said nozzle plug, the sealing of the upper ends of said nozzle plug openings by said resilient member during the dispensing of said liquid being operative to maintain said nozzle plug openings substantially full of said liquid.

2. A dripless precision cutoff nozzle assembly adapted for dispensing a low viscosity liquid, comprising a casing providing a circular chamber therein having an outlet opening through one end and an adjacent inlet opening in the side thereof, a nozzle plug mounted in said outlet opening extending inwardly into said chamber and terminating in an inner end providing a flat inner face, said plug having a plurality of openings therethrough of very small diameter communicating from the inner face of said plug to the exterior face thereof, the exterior end of said plug being open to the atmosphere and providing the dispensing point for said liquid, a piston plug slidably mounted within said chamber so as to seat on the inner face of said nozzle plug, said piston plug having a recess in the end thereof adjacent the end of said nozzle plug to receive the inner end of said nozzle plug, said recess having a flexible resilient sealing member mounted therein so as to cover the inner face of said nozzle plug when engaged therewith, said piston plug also having sealing means therearound arranged to dynamically seal said piston plug to the inner wall of said casing, and means for normally urging said piston plug into sealing engagement with said nozzle plug.

3. A dripless precision cutoff nozzle assembly adapted for dispensing a low viscosity liquid, comprising a casing providing a circular chamber therein having an outlet opening through one end and an adjacent inlet opening in the side thereof, a nozzle plug mounted in said outlet opening extending inwardly into said chamber and terminating in an inner end providing a flat inner face, said plug having a plurality of openings therethrough of very small diameter communicating from the inner face of said plug to the exterior face thereof, the exterior end of said plug being open to the atmosphere and providing the dispensing point for said liquid, a piston plug slidably mounted within said chamber so as to seat on the inner face of said nozzle plug, said piston plug having a recess in the end thereof adjacent the end of said nozzle plug to receive the inner end of said nozzle plug, said recess having a flexible resilient sealing member mounted therein so as to cover the inner face of said nozzle plug when engaged therewith, said piston plug also having sealing means therearound arranged to dynamically seal said piston plug to the inner wall of said casing, spring means normally urging said piston plug into sealing engagement with said nozzle plug, and means for limiting the outward movement of said piston plug when disengaged from said nozzle plug to a closely spaced distance from said nozzle plug, the sealing of the upper ends of said nozzle plug openings by said resilient member during the dispensing of said liquid being operative to maintain said nozzle plug openings substantially full of said liquid.

4. A dripless precision cutoff nozzle assembly adapted for dispensing a low viscosity liquid, comprising a casing providing a circular chamber therein having an outlet opening through one end and an adjacent inlet opening in the side thereof, a nozzle plug mounted in said outlet opening extending inwardly into said chamber and terminating in an inner end providing a flat inner face, said plug having a plurality of openings therethrough of very small diameter communicating from the inner face of said plug to the exterior face thereof, the diameter of said plug opening ranging from about .05 to 3 millimeters and the exterior end of said plug being open to the atmosphere and providing the dispensing point for said liquid, a piston plug slidably mounted within said chamber so as to seat on the inner face of said nozzle plug, said piston plug having a recess in the end thereof adjacent the end of said nozzle plug to receive the inner end of said nozzle plug, said recess having a flexible resilient sealing member mounted therein so as to cover the inner face of said nozzle plug when engaged therewith, said piston plug also having sealing means therearound arranged to dynamically seal said piston plug to the inner wall of said casing, a guide pin secured to the top of said piston plug and extending upwardly therefrom, a closure for the upper end of said casing having an aperture therein slidably receiving the reduced end of said guide pin, means associated with said guide pin for restricting the outward movement of said piston plug to a very short distance, and spring means coiled around said guide pin normally urging said piston plug into sealing engagement with said nozzle plug the sealing of the upper ends of said nozzle plug openings by said resilient member during the dispensing of said liquid being operative to maintain said nozzle plug openings substantially full of said liquid.

5. A dripless precision cutoff nozzle assembly adapted for dispensing a liquid, comprising a casing providing a chamber therein and having an outlet through one end and an adjacent inlet opening, a nozzle plug maintained in said opening, said plug having a plurality of capillary passages therethrough communicating from the inner end of said plug to the exterior end thereof, the exterior end of said plug being open to the atmosphere and providing the dispensing point for said liquid, a piston plug slidably mounted within said chamber and having an inner end bottoming on the inner end of said nozzle plug, said piston plug having sealing means therearound arranged to dynamically seal said piston plug to the inner walls of said casing and a resilient member on the inner end thereof adjacent the inner end of said nozzle plug arranged to seal the inner ends of said nozzle plug passages when said piston plug is bottomed on said nozzle plug, and yieldable means for normally urging said resilient member into sealing engagement with said nozzle plug, the sealing of the upper ends of said nozzle plug passages by said resilient member during the dispensing of said liquid being operative to maintain said nozzle plug passages substantially full of said liquid.

References Cited in the file of this patent

UNITED STATES PATENTS

| Number | Name | Date |
|---|---|---|
| 338,053 | Freely | Mar. 16, 1886 |
| 402,640 | Woodward | May 7, 1889 |
| 486,600 | McGowan | Nov. 22, 1892 |
| 710,889 | Prescott | Oct. 7, 1902 |
| 892,594 | Killian | July 7, 1908 |
| 1,353,098 | Wainwright | Sept. 14, 1920 |
| 1,559,894 | Lansing | Nov. 3, 1925 |
| 1,751,693 | Gentle | Mar. 25, 1930 |
| 1,905,913 | Kopp | Apr. 25, 1933 |
| 1,964,623 | Durand | June 26, 1934 |
| 2,491,905 | Ray | Dec. 20, 1949 |

FOREIGN PATENTS

| Number | Country | Date |
|---|---|---|
| 61,719 | Norway | Nov. 13, 1939 |